United States Patent
Kamizono et al.

(10) Patent No.: US 7,701,338 B2
(45) Date of Patent: Apr. 20, 2010

(54) OCCUPANT DETECTION SYSTEM AND METHOD OF DETERMINING OCCUPANT

(75) Inventors: Tsutomu Kamizono, Nagoya (JP); Eiichi Nishio, Nagoya (JP)

(73) Assignee: Denso Corporation, Kariya (JP)

( * ) Notice: Subject to any disclaimer, the term of this patent is extended or adjusted under 35 U.S.C. 154(b) by 411 days.

(21) Appl. No.: 11/703,049

(22) Filed: Feb. 6, 2007

(65) Prior Publication Data

US 2007/0182553 A1    Aug. 9, 2007

(30) Foreign Application Priority Data

Feb. 7, 2006   (JP)  ............... 2006-030187
Jul. 10, 2006  (JP)  ............... 2006-189535

(51) Int. Cl.
  *G08B 13/26*   (2006.01)
  *B60L 1/00*    (2006.01)
  *B60L 3/00*    (2006.01)
  *H02G 3/00*    (2006.01)

(52) U.S. Cl. ..................... 340/561; 307/10.1
(58) Field of Classification Search .......... 340/561; 307/10.1
See application file for complete search history.

(56) References Cited

U.S. PATENT DOCUMENTS

| | | | |
|---|---|---|---|
| 5,948,031 A | 9/1999 | Jinno et al. | |
| 5,986,549 A * | 11/1999 | Teodorescu | 340/561 |
| 6,161,070 A | 12/2000 | Jinno et al. | |
| 6,208,249 B1 | 3/2001 | Saito et al. | |
| 6,283,504 B1 | 9/2001 | Stanley et al. | |
| 6,290,255 B1 | 9/2001 | Stanley et al. | |
| 6,348,862 B1 | 2/2002 | McDonnell et al. | |
| 6,378,900 B1 | 4/2002 | Stanley et al. | |
| 6,392,542 B1 * | 5/2002 | Stanley | 340/561 |
| 6,445,294 B1 | 9/2002 | McDonnell et al. | |
| 6,517,106 B1 | 2/2003 | Stanley et al. | |
| 6,520,535 B1 | 2/2003 | Stanley et al. | |
| 6,563,231 B1 | 5/2003 | Stanley et al. | |
| 6,577,023 B1 | 6/2003 | Stanley et al. | |

(Continued)

FOREIGN PATENT DOCUMENTS

JP          11/271463        10/1999

(Continued)

OTHER PUBLICATIONS

Office Action dated Feb. 1, 2008 in German Application No. 10 2007 004593.1-21 with English translation thereof.

(Continued)

*Primary Examiner*—Benjamin C Lee
*Assistant Examiner*—Andrew Bee
(74) *Attorney, Agent, or Firm*—Harness, Dickey & Pierce, PLC

(57) ABSTRACT

An occupant detection system for detecting an occupant on a seat of a vehicle includes an antenna electrode in a seat bottom of the seat, and an electronic unit connected to the antenna electrode and the vehicle. The electronic unit applies a load current to the antenna electrode so as to generate a weak electric field, and detects a potential current passing through the antenna electrode. The electronic unit detects an occupant based on an impedance and a phase difference, which are based on the load current and the potential current.

6 Claims, 8 Drawing Sheets

U.S. PATENT DOCUMENTS

| | | |
|---|---|---|
| 6,577,142 B2 | 6/2003 | Eisenmann et al. |
| 6,598,900 B2 | 7/2003 | Stanley et al. |
| 6,703,845 B2 | 3/2004 | Stanley et al. |
| 6,816,077 B1 | 11/2004 | Shieh et al. |
| 6,825,765 B2 | 11/2004 | Stanley et al. |
| 6,859,141 B1 * | 2/2005 | Van Schyndel et al. ..... 340/562 |
| 7,065,438 B2 | 6/2006 | Thompson et al. |
| 7,084,763 B2 | 8/2006 | Shieh et al. |
| 7,135,983 B2 * | 11/2006 | Filippov et al. ............. 340/667 |
| 7,191,044 B2 | 3/2007 | Thompson et al. |
| 7,271,730 B2 * | 9/2007 | Kimura et al. .............. 340/667 |
| 7,401,532 B2 | 7/2008 | Wanami |
| 2003/0122553 A1 * | 7/2003 | Arias ........................ 324/658 |
| 2004/0113634 A1 | 6/2004 | Stanley et al. |
| 2004/0199318 A1 | 10/2004 | Shieh et al. |
| 2004/0232774 A1 * | 11/2004 | Thompson et al. ......... 307/10.1 |
| 2005/0128082 A1 | 6/2005 | Stanley et al. |
| 2006/0187038 A1 | 8/2006 | Shieh et al. |

FOREIGN PATENT DOCUMENTS

| | | |
|---|---|---|
| JP | 2001-153963 | 6/2001 |
| JP | 2001-174567 | 6/2001 |

OTHER PUBLICATIONS

Search Report with Written Opinion dated October 5, 2009 in the corresponding FR Application No. 0700879 (with English translation).

* cited by examiner

OCCUPANT DETECTION SYSTEM AND METHOD OF DETERMINING OCCUPANT

CROSS REFERENCE TO RELATED APPLICATION

This application is based on Japanese Patent Applications No. 2006-30187 filed on Feb. 7, 2006, and No. 2006-189535 filed on Jul. 10, 2006, the disclosures of which are incorporated herein by reference in their entirety.

BACKGROUND OF THE INVENTION

1. Field of the Invention

The present invention relates to an occupant detection system for detecting an occupant on a vehicle seat and a method of determining the occupant.

2. Description of Related Art

An air-bag device is mounted in a vehicle in order to reduce damage to an occupant when the vehicle collides with an object such as another vehicle. The air-bag device is provided in a passenger seat in addition to a driver seat. The air-bag device is actuated, when a calculating unit of the air-bag device determines that the vehicle collides with the object. The calculating unit performs calculations based on signals output from a sensor, e.g., acceleration sensor, on the vehicle.

The air-bag device is set to be actuated, whenever the vehicle collides with the object, even if any occupant is not seated on the passenger seat. However, the air-bag device is not to be actuated, when a body size of the occupant is small. An adult can be protected by the air-bag device, when the vehicle collides with the object. In contrast, for example, a child may not be protected by the air-bag device, and rather a head of the child may be damaged by the air-bag device, because the head of the child is positioned lower than that of the adult.

In order to determine whether the occupant is an adult or not, an occupant detection system having an occupant detection sensor is provided on the passenger seat. For example, Japanese Patent No. 3346464 discloses an occupant detection system for detecting an occupant and its seating state. The occupant detection system includes plural pairs of antenna electrodes in the passenger seat, so that one of the pairs of antenna electrodes can detect the occupant.

However, if the passenger seat is wet, detection accuracy of the system may be lowered. In this case, because whole wet part operates as an antenna, an erroneous output larger than a correct output may be output. Thus, the system may determine the occupant to be an adult, while the occupant is a child. As a result, the air-bag device may be erroneously actuated.

In contrast, U.S. Pat. No. 6,816,077 (corresponding to JP-A-2002-347498) discloses an occupant detection system having a moisture sensor in a seat. This system can have high detection accuracy, because erroneous detections due to moisture in the seat can be reduced. However, the moisture sensor causes an increase in its product cost.

Moreover, US 2005/0128082 A1 (corresponding to JP-A-2003-504624) discloses an occupant-detecting device including an electric field sensor and a detection circuit. The detection circuit applies vibration signals to an electric field such that the vibration signals are most weakly affected by moisture in a seat. However, affects caused by the moisture cannot completely be eliminated.

SUMMARY OF THE INVENTION

In view of the foregoing and other problems, it is an object of the present invention to provide an occupant detection system and a method of determining an occupant, which reduce erroneous detections and determinations.

According to a first example of the present invention, an occupant detection system for detecting an occupant on a seat of a vehicle includes an antenna electrode in a seat bottom of the seat, and an electronic unit connected to the antenna electrode and the vehicle. The electronic unit applies a load current to the antenna electrode so as to generate a weak electric field, and detects a potential current passing through the antenna electrode. The electronic unit detects an occupant based on an impedance and a phase difference, which are based on the load current and the potential current.

According to a second example of the present invention, an occupant detection system for detecting an occupant on a seat of a vehicle includes an antenna electrode in a seat bottom of the seat, and an electronic unit connected to the antenna electrode and the vehicle. The electronic unit applies a load current to the antenna electrode so as to generate a weak electric field, and detects a potential current passing through the antenna electrode. The electronic unit detects an occupant based on a conductance and a susceptance of an admittance, which is based on the load current and the potential current.

According to a third example of the present invention, a method of determining an occupant on a seat of a vehicle includes an applying step, a detecting step, a calculating step and a comparing step. In the applying step, a load current is applied to an antenna electrode in a seat bottom of the seat so as to generate a weak electric field. In the detecting step, a potential current generated by the electric field is detected. The load current and the potential current are varied by the occupant. In the calculating step, at least one of a set of an impedance and a phase difference, and a conductance and a susceptance of an admittance is calculated based on the load current and the potential current. In the comparing step, the impedance and a threshold corresponding to the phase difference are compared, or the susceptance and a threshold corresponding to the conductance are compared.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1:
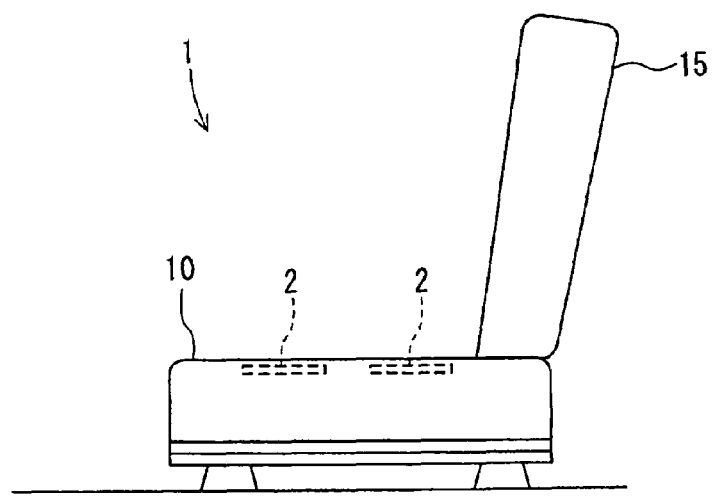
FIG. 1 is a side view showing a seat having an occupant detection system according to a first embodiment of the present invention.

As shown in FIG. 1, a vehicle seat 1 includes a seat bottom 10 and a seat back 15. An antenna electrode 2 is disposed in the seat bottom 10.

Figure 2:
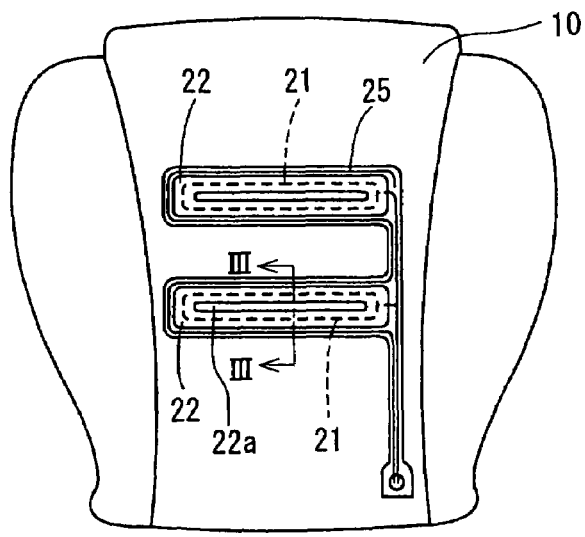
FIG. 2 is a plan view of a seat bottom of the seat in FIG. 1.
Figure 3:
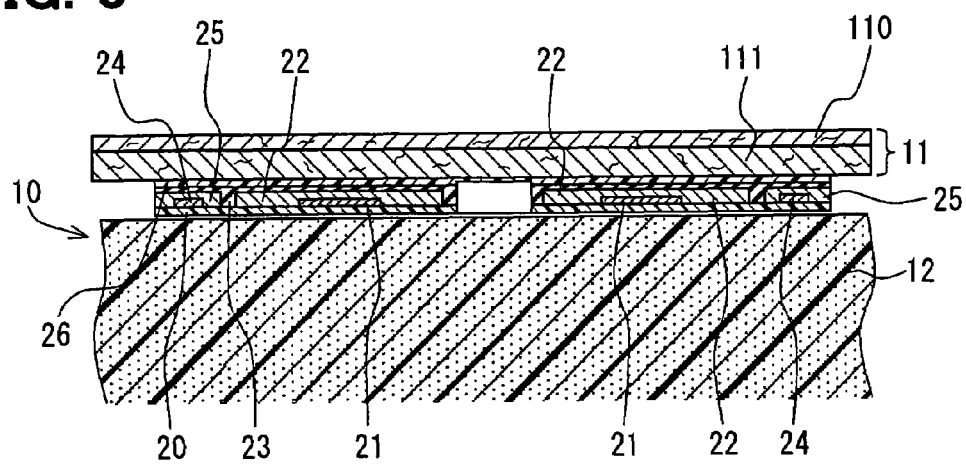
FIG. 3 is a cross-sectional view taken along line III-III in FIG. 2.

A construction of the antenna electrode 2 will be described with reference to FIGS. 2 and 3. The antenna electrode 2 includes an insulation film 20 made of resin. A first conductor 21 is arranged on the insulation film 20 by applying and drying silver ink. The first conductor 21 is shaped into an approximately circular rectangle. Two first conductors 21 are arranged through a predetermined clearance therebetween in a minor length direction of the rectangle, that is, in an up-and-down direction in FIG. 2. The first conductors 21 are electrically connected to each other by the silver ink. A first electrode 22 is formed to cover the first conductor 21 by applying and drying carbon ink. A shape of the first electrode 22 is approximately similar to that of the first conductor 21, and the first electrode 22 has an aperture 22a around an approximately center axis of the first conductor 21.

A second conductor 24 is formed along a peripheral part of the first conductor 21 by applying and drying the silver ink. A second electrode 25 is formed to cover the second conductor 24 by applying and drying the carbon ink. The first and second electrodes 22, 25 are arranged adjacent to each other so as not to be in contact with each other. The first and second electrodes 22, 25 are coated with an insulation adhesive 23, and an insulation film 26 made of resin is layered on the insulation adhesive 23.

The antenna electrode 2 is disposed in the seat bottom 10 such that the two first electrodes 22 are arranged in a back-and-forth direction of the vehicle. The first and second conductors 21, 24 are electrically connected to an electronic unit (not shown). The antenna electrode 2 is arranged between a cushion pad 12 and a cushion cover 11. The cushion cover 11 is integrally constructed with a covering part 110 and a lamination part 111.

The electronic unit applies a load current having a predetermined characteristic to the antenna electrode 2, i.e., the first and second electrodes 22, 25, and detects a potential current representing a variation of an electric field generated by each of the antenna electrodes 2. Further, the electronic unit calculates an impedance and a phase difference based on the load current applied to the antenna electrode 2 and the potential current passing through the antenna electrode 2 so as to detect an occupant on the seat 1.

The impedance represents an amount of interfering an alternating current in an electric component or circuit at a predetermined frequency. In the first embodiment, the impedance Z can be calculated by dividing an amplitude V of the potential current by an amplitude I of the load current ($Z=V/I$). The phase difference represents a delay (lag) phase difference from a voltage (the potential current) to a current (the load current).

The electronic unit may include an electric control unit (ECU) comprised of a microcomputer for the vehicle. However, the electronic unit may be any other devices capable of sending and receiving current signals with the antenna electrode 2.

Figure 4:
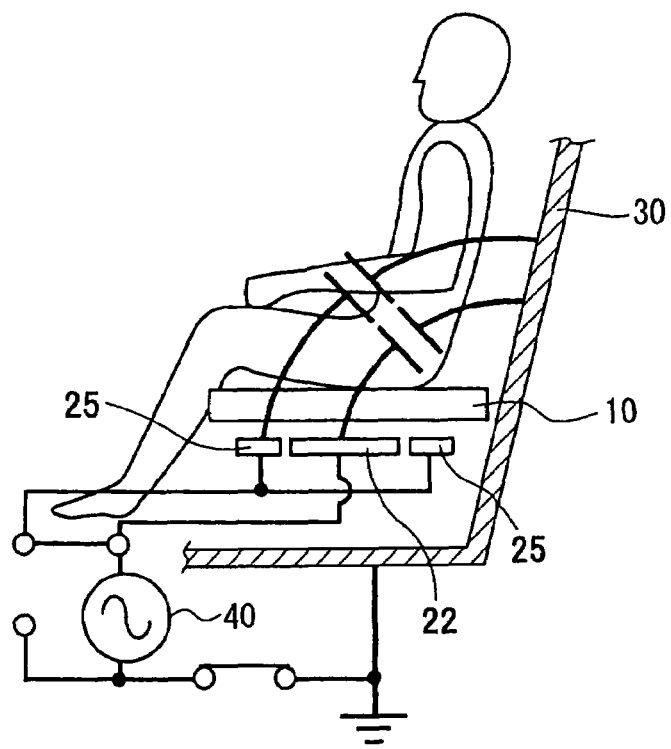
FIG. 4 is a diagram showing a remote detection of the system.

An occupant detection system including the antenna electrode 2 and the electronic unit performs a remote detection and a proximity detection. The remote detection represents detections of an impedance and a phase difference between the seat bottom 10 and a vehicle chassis 30 connected to the ground, as shown in FIG. 4. The proximity detection represents detections of an impedance and a phase difference between the first and second electrodes 22, 25 of the antenna electrode 2, as shown in FIG. 5.

As shown in FIG. 4, in the remote detection, a high-frequency and low-voltage signal is applied from a signal source 40 of the electronic unit to the antenna electrode 2 in the seat bottom 10. An electric field is generated by a potential difference between the vehicle chassis 30 and the antenna electrode 2. As a result, current (potential current) flows in the antenna electrode 2. The potential current is measured in a shunt of the signal source 40.

If the occupant exists in the electric field, the electric field fluctuates and the fluctuation generates a variation of the potential current. Similarly, the load current supplied to the antenna electrode 2 varies in response to the occupant. Because a body of the occupant operates as a capacitor, an impedance (resistance and capacitance) of the occupant body shunts the electric field. Thus, the load current and the potential current are varied in response to electrical characteristics of the occupant body. Thereby, the impedance and the phase difference between the seat bottom 10 and the vehicle chassis 30 can be measured.

Figure 5:
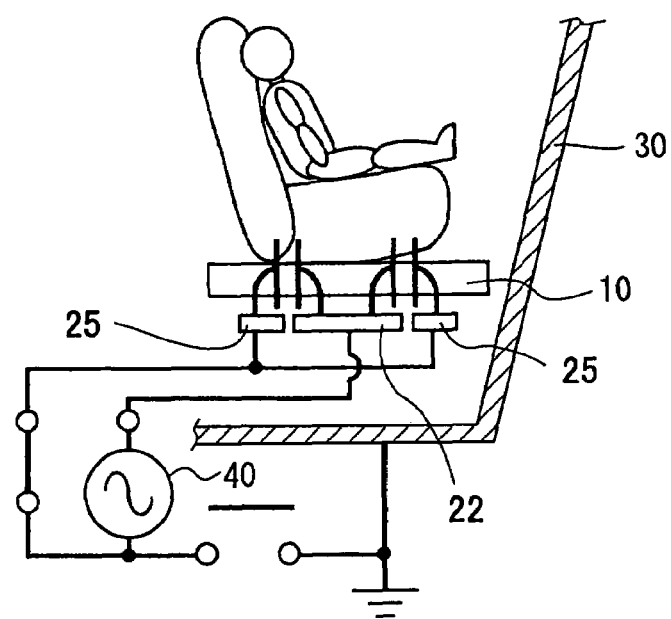
FIG. 5 is a diagram showing a proximity detection of the system.

In contrast, as shown in FIG. 5, in the proximity detection, a high-frequency and low-voltage signal is applied from the signal source 40 between the first and second electrodes 22, 25. Then, an impedance and a phase difference between the electrodes 22, 25 is measured, similarly to the remote detection.

Figure 6:
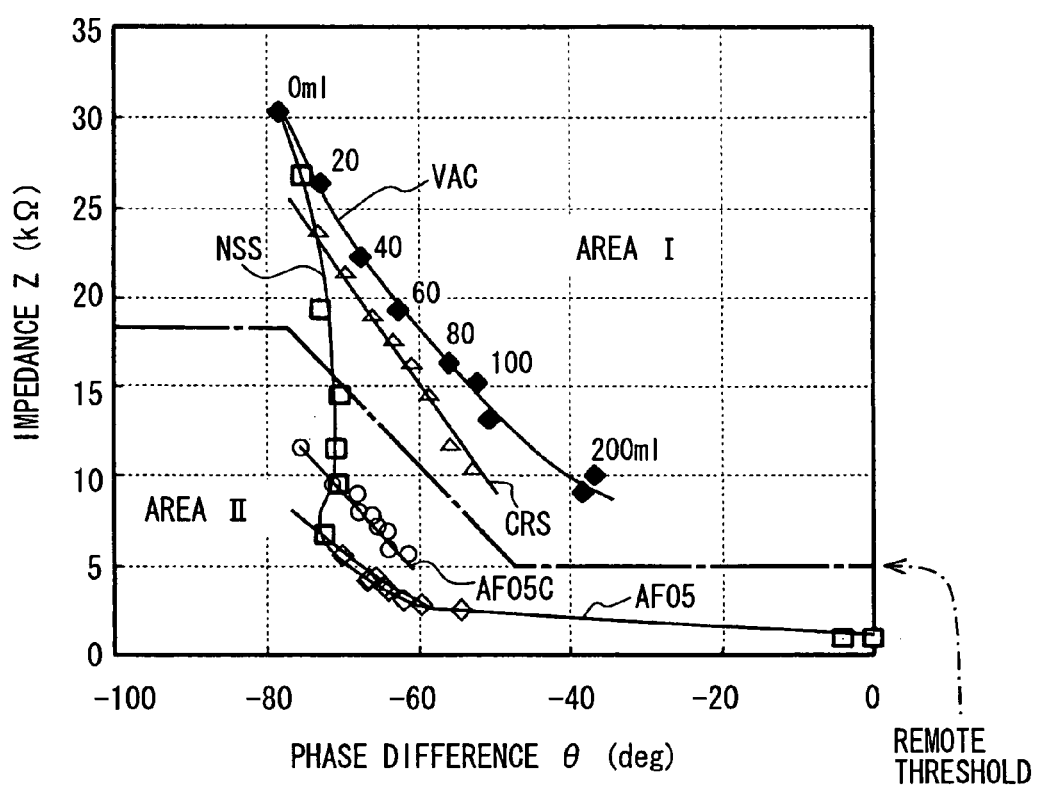
FIG. 6 is a graph showing a relationship between a phase difference and an impedance for the remote detection.

Here, in one experimental measurement, a small female adult or a one-year-old child on a child seat is seated on the seat 1. The small female adult occupies five percentile among American female adults in a body size distribution. The one-year-old child is on the child seat, and the child seat is fixed to the seat 1, as shown in FIG. 5. Then, impedances Z and phase differences θ between the antenna electrode 2 and the vehicle chassis 30 are measured in various conditions, and these experimental results of the small female adult (AF05) or the one-year-old child, i.e., child seat, (CRS) are shown in FIG. 6. Further, the impedances Z and the phase differences θ between the antenna electrode 2 and the vehicle chassis 30 are measured, when the small female adult having on three winter clothes (AF05C) is seated on the seat 1. Furthermore, the impedances Z and the phase differences θ between the antenna electrode 2 and the vehicle chassis 30 are measured, when any occupant is not seated on the seat 1, that is, when the seat 1 is vacant (VAC).

Then, water is uniformly sprinkled on the seat 1. The impedances Z and the phase differences θ between the antenna electrode 2 and the vehicle chassis 30 are measured, when an amount of the water is 0, 20, 40, 60, 80, 100 and 200 ml. As shown in FIG. 6, when the seat 1 is not wet, that is when the amount of the water is 0 ml, the phase differences θ of VAC, AF05, AF05C and CRS are approximately similar to each other. In contrast, the impedances Z are different between AF05 and CRS, because a body size is different between the adult and the child.

When the amount of the water is increased, the impedances Z are decreased in each of VAC, AF05, AF05C and CRS.

However, a difference of the impedances Z between the adult AF05, AF05C and the child (child seat) CRS is large, while the impedances Z are decreased. That is, the difference of the impedances Z can be secured between the adult and the child, while the amount of the water is increased. Thus, the occupant can be detected, even if the seat 1 is wet. Accordingly, the occupant can be detected by providing a remote threshold as shown by a one-dot chain line in FIG. 6, for example.

Moreover, the impedances Z and the phase differences θ between the antenna electrode 2 and the vehicle chassis 30 are measured, when normal saline solution (NSS), i.e., conductive liquid, is uniformly sprinkled on the seat 1 without any occupant, in which an amount of the normal saline solution NSS is 0, 20, 40, 60, 80, 100 and 200 ml. As shown in FIG. 6, when the normal saline solution NSS is sprinkled on the seat 1, the impedance Z of NSS is significantly decreased. The impedance Z of NSS is decreased from an adjacency of VAC to an adjacency of AF05.

Next, an impedance Z and a phase difference θ between the first electrode 22 and the second electrode 25 are measured, when water is sprinkled on the seat 1 with the small female adult AF05, AF05C. Further, the impedance Z and the phase difference θ between the first electrode 22 and the second electrode 25 are measured, when the normal saline solution NSS is sprinkled on the seat 1 without any occupant. These experimental results are shown in FIG. 7.

When the seat 1 is not wet, the impedance Z is approximately the same among AF05, AF05C and NSS. In contrast, when the normal saline solution NSS is sprinkled on the seat 1, the impedance Z of NSS is significantly decreased. The impedance Z of NSS is much smaller than those of AF05, AF05C. Accordingly, the occupant can be detected by providing a proximity threshold as shown by a two-dot chain line in FIG. 7, for example.

That is, the occupant detection system in the first embodiment detects the occupant based on the impedance and the phase difference in each of the remote detection and the proximity detection. Therefore, even if the seat 1 is wet with a large amount of water, the occupant can be detected.

Figure 7:
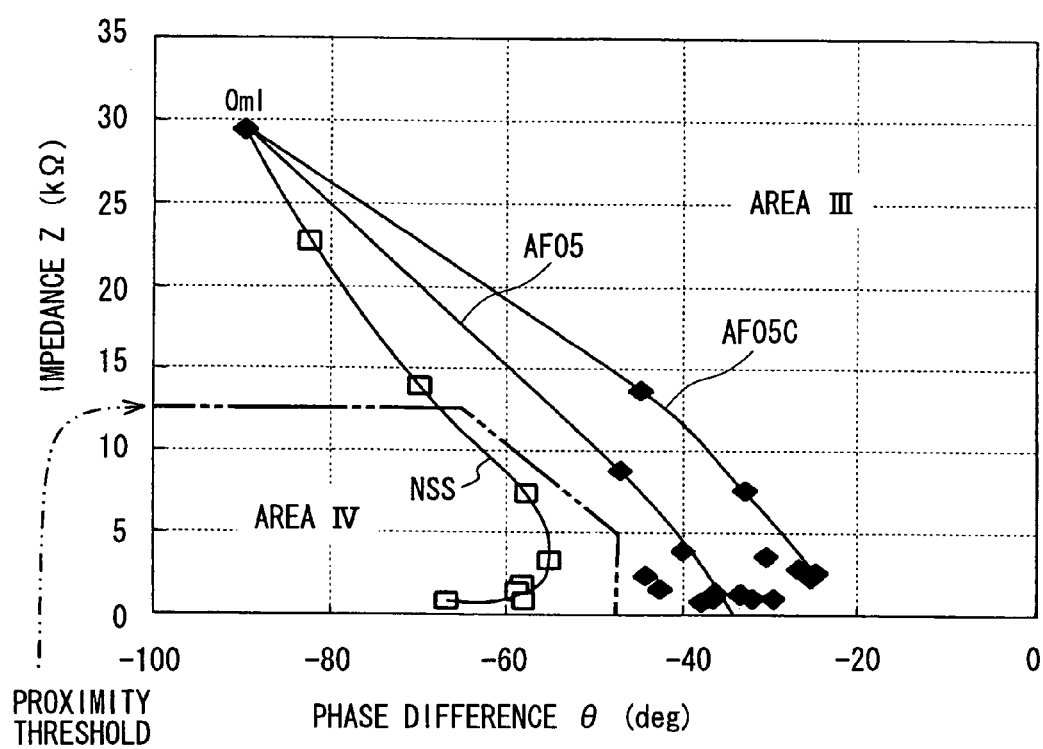
FIG. 7 is a graph showing a relationship between a phase difference and an impedance for the proximity detection.
Figure 8:
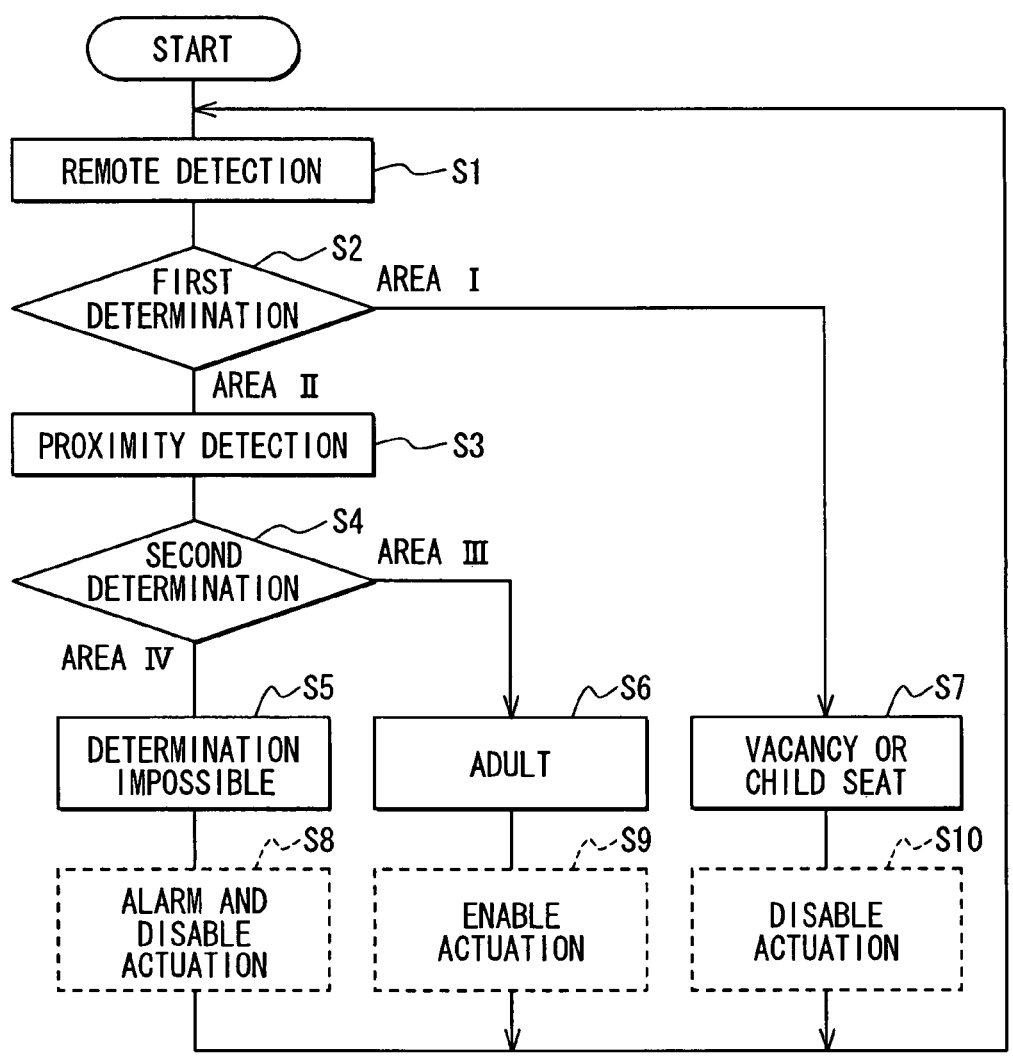
FIG. 8 is a flow chart of occupant detection in the first embodiment.

When the occupant detection system has the remote and proximity thresholds shown in FIGS. 6 and 7, determination of the occupant can be performed by the electronic unit, as shown in FIG. 8. First, the remote detection (S1) is performed as described above so as to provide the impedance and the phase difference between the seat bottom 10 and the vehicle chassis 30. Then, a remote threshold corresponding to the impedance is determined based on the phase difference, and a first determination (S2) is performed. The impedance is compared with the remote threshold. When the impedance is larger than the remote threshold, that is, when the impedance is in an area I shown in FIG. 6, the seat 1 is determined to be vacant or the child seat is determined to be on the seat 1 (S7).

In contrast, when the impedance is equal to or smaller than the remote threshold, that is, when the impedance is in an area II shown in FIG. 6, the proximity detection (S3) is performed thereafter. A proximity threshold corresponding to an impedance of the proximity detection is determined based on a phase difference of the proximity detection, and a second determination (S4) is performed. The impedance of the proximity detection is compared with the proximity threshold. When the impedance of the proximity detection is larger than the proximity threshold, that is, when the impedance of the proximity detection is in an area III shown in FIG. 7, the occupant on the seat 1 is determined to be the adult (S6). When the impedance of the proximity detection is equal to or smaller than the proximity threshold, that is, when the impedance of the proximity detection is in an area IV shown in FIG. 7, the determination of the occupant is determined to be impossible (S5).

The occupant detection system is capable of sending the determination result into an occupant-restraining device, e.g., air-bag device. Therefore, the occupant-restraining device can be accurately actuated in accordance with the occupant. Specifically, when the seat 1 is determined to be vacant or when the child seat is determined on the seat 1 (S7), the occupant-restraining device is disabled to be actuated (S10) even when the vehicle collides with an object.

When the determination of the occupant is impossible (S5), an alarm is raised, and the occupant-restraining device is disabled to be actuated (S8). The occupant-restraining device is enabled to be actuated to protect the occupant (S9), only when the occupant is determined to be the adult (S6). In a case in which the child is on the child seat on the seat 1, the occupant-restraining device is disabled to be actuated (S10), because the child may be damaged by the actuation of the occupant-restraining device.

According to the first embodiment, the occupant detection system includes the antenna electrode 2 and the electronic unit. The occupant on the seat 1 can be detected by using the impedance and the phase difference based on the potential current.

Specifically, the electronic unit applies electricity (the load current) to the antenna electrode 2 so as to generate a weak electric field. The electric field generates the potential current passing through the antenna electrode 2, because a potential is different between the antenna electrode 2 and the vehicle chassis 30. The impedance and the phase difference between the vehicle chassis 30 and the antenna electrode 2 are provided based on the load current and the potential current. The occupant can be detected based on the impedance and the phase difference.

Here, when an alternating current (AC) circuit has larger impedance, an amount of current in the AC circuit is decreased. The impedance is small, when the seat 1 is wet. The impedance is decreased, when the amount of water is increased. That is, the occupant can be detected based on the impedance, even when the seat 1 is wet. In contrast, the phase difference represents a delay (lag) phase difference from a voltage to a current. The phase difference is large when the seat 1 is wet. The phase difference is increased, when the amount of water is increased.

The antenna electrode 2 includes a proximity electrode for measuring the impedance and the phase difference in the seat bottom 10 of the seat 1. The occupant on the seat 1 can be detected based on the impedance and the phase difference in the seat bottom 10. If a conductive liquid is included in the seat bottom 10, the impedance between the antenna electrode 2 and the vehicle chassis 30 is decreased, thereby erroneous detections may be increased. However, a state of the seat bottom 10 can be detected, because the proximity electrode can provide the impedance and the phase difference in the seat bottom 10. In this case, the proximity threshold can be set in accordance with the state of the seat bottom 10.

That is, the occupant can be detected based on the impedance and the phase difference in the seat bottom 10, other than the impedance and the phase difference between the seat bottom 10 and the vehicle chassis 30. Thus, detection accuracy can be improved.

A specific construction of the occupant detection system is not limited to the above example. For example, an electrode and a electronic unit included in a conventional capacitive occupant detection system may be used in the first embodiment.

The antenna electrode 2 is disposed in the seat bottom 10 of the seat 1. Typically, a seat bottom includes a frame, a spring in the frame, a cushion pad on the spring, and a cushion cover on the cushion pad. The antenna electrode 2 may be disposed between the spring and the cushion pad, while the antenna electrode 2 is disposed between the cushion pad 12 and the cushion cover 11 in this embodiment. When the antenna electrode 2 is disposed between the spring and the cushion pad, the occupant may be comfortably seated on the seat bottom 10 due to the cushion pad. In addition, because the first electrode 22 has the aperture 22a, rigidity of the antenna electrode 2 can be lowered. Thus, the occupant may be more comfortably seated on the seat bottom 10.

The antenna electrode 2 is shaped into a foil, which is approximately parallel to the seat bottom 10. When the load current is applied to the antenna electrode 2, a weak electric field is generated from each of a top face and a bottom face of the antenna electrode 2 upward and downward, respectively. The two electric fields generate the potential current in the antenna electrode 2. The electronic unit, connected to the antenna electrode 2 and the vehicle chassis 30, applies the load current to the antenna electrode 2 so as to generate the electric fields, and detects the potential current passing through the antenna electrode 2.

The occupant detection system may include a calculating circuit for calculating the impedance and the phase difference based on the load current and the potential current. The occupant detection system may further include a determining circuit for determining the occupant based on the impedance and the phase difference. The calculating circuit and the determining circuit may be integrated into one unit.

The occupant detection system may include an occupant-restraining device, e.g., air-bag device. Because the occupant detection system can accurately detect the occupant, malfunction of the occupant-restraining device can be reduced.

Second Embodiment

In this embodiment, the antenna electrode 2 is disposed in the seat bottom 10 of the vehicle seat 1, similarly to the first embodiment. The antenna electrode 2 is electrically connected to the electronic unit. The electronic unit applies a load current having a predetermined characteristic to the antenna electrode 2, i.e., first and second electrodes 22, 25, and detects a potential current representing a variation of an electric field generated by each of the antenna electrodes 2. Further, the electronic unit calculates an admittance, i.e., conductance G and susceptance B, based on the load current and the potential current so as to detect the occupant. The electronic unit includes an electric control unit (ECU) for the vehicle. However, any other devices capable of sending and receiving current signals may be used as the electronic unit.

The amount of water in the seat 1 and the admittance have a correlation therebetween. That is, the occupant can be detected based on the admittance, even if the seat 1 is wet.

Mathematically, an admittance Y is a reciprocal of an impedance Z. The impedance Z represents an amount of interfering an alternating current in an electric component or circuit at a predetermined frequency. The impedance Z is used as a vector quantity on a complex plane. The impedance Z can be expressed as Formula 1, in which R is a resistance corresponding to a real part, and X is a reactance corresponding to an imaginary part.

$$Z=R+iX \quad \text{(Formula 1)}$$

Because the admittance Y is the reciprocal of the impedance Z, the admittance Y can be expressed as Formula 2, in which G represents the conductance, and B represents the susceptance.

$$Y=1/Z=1/(R+iX)=G+iB \quad \text{(Formula 2)}$$

That is, the admittance Y represents a state in which the resistance R and the reactance X are connected in parallel.

Here, when the seat 1 is wet, the resistance R and the reactance X are connected in parallel. The occupant detection system according to the second embodiment detects the occupant based on the admittance Y. Therefore, results (data) of the admittance Y are not required to be further processed. Thus, the occupant can be easily detected.

The occupant detection system performs a remote detection and a proximity detection, similarly to the first embodiment. The remote detection represents detections of the conductance G and the susceptance B between the seat bottom 10 and a vehicle chassis 30. The proximity detection represents detections of the conductance G and the susceptance B between the first and second electrodes 22, 25 of the antenna electrode 2.

Figure 9:
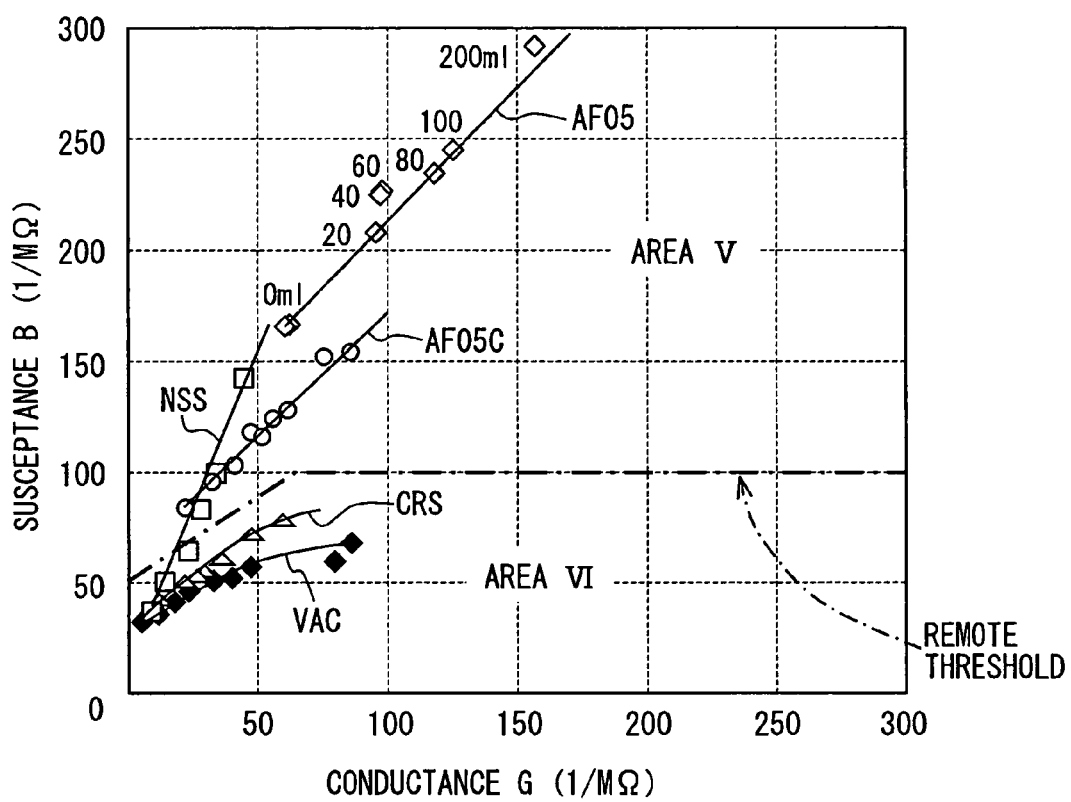
FIG. 9 is a graph showing a relationship between a conductance and a susceptance for a remote detection in an occupant detection system according to a second embodiment.

Here, a small female adult or a one-year-old child on a child seat is seated on the seat 1. The small female adult occupies five percentile among American female adults in a body size distribution. The one-year-old child is on the child seat, and the child seat is fixed to the seat 1. Then, the conductance G and the susceptance B between the antenna electrode 2 and the vehicle chassis 30 are measured, and these experimental results of the small female adult (AF05) or the one-year-old child, i.e., child seat, (CRS) are shown in FIG. 9. Further, the conductance G and the susceptance B between the antenna electrode 2 and the vehicle chassis 30 are measured, when the small female adult wearing three winter clothes (AF05C) is seated on the seat 1. Furthermore, the conductance G and the susceptance B between the antenna electrode 2 and the vehicle chassis 30 are measured, when any occupant is not seated on the seat 1, that is, when the seat 1 is vacant (VAC).

Then, water is uniformly sprinkled on the seat 1. The conductance G and the susceptance B between the antenna electrode 2 and the vehicle chassis 30 are measured, when an amount of the water is 0, 20, 40, 60, 80, 100 and 200 ml.

Moreover, the conductance G and the susceptance B between the antenna electrode 2 and the vehicle chassis 30 are measured, when normal saline solution (NSS), i.e., conductive liquid, is uniformly sprinkled on the seat 1 without any occupant, in which an amount of the normal saline solution NSS is 0, 20, 40, 60, 80, 100 and 200 ml.

As shown in FIG. 9, as the amount of the water is increased, each of the conductance G and the susceptance B is increased in each of VAC, AF05, AF05C and CRS. The susceptance B of AF05 is much larger than those of VAC and CRS. That is, the susceptance B becomes larger, when a weight of the occupant is increased. Especially, a difference of the susceptance B between the adult and the child is large in a high-conductance area, in which the amount of water is large. Therefore, the occupant can be more easily detected. Accordingly, the occupant can be detected by providing a remote threshold shown by a one-dot chain line in FIG. 9.

Next, a conductance G and a susceptance B between the first electrode 22 and the second electrode 25 are measured, when water is sprinkled on the seat 1 with the small female adult AF05, AF05C. Further, the conductance G and the susceptance B between the first electrode 22 and the second electrode 25 are measured, when the normal saline solution NSS is sprinkled on the seat 1 without any occupant. These experimental results are shown in FIG. 10.

Figure 10:
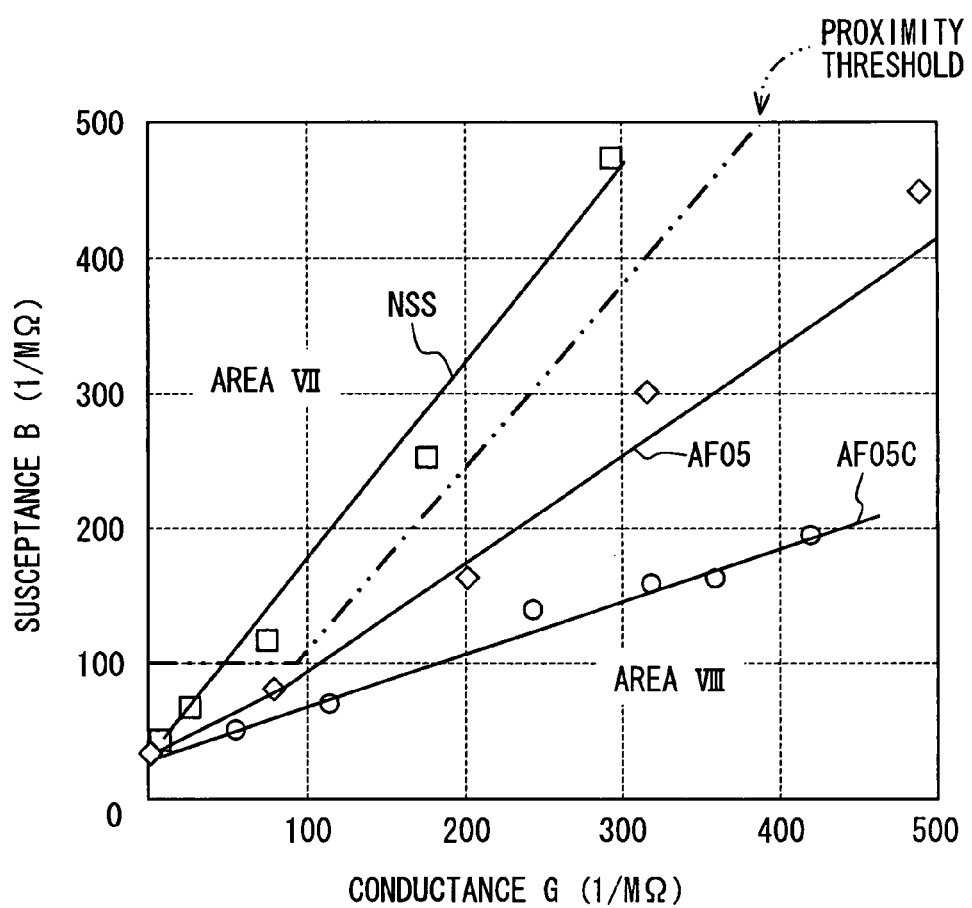
FIG. 10 is a graph showing a relationship between a conductance and a susceptance for a proximity detection in the second embodiment.

As shown in FIG. 10, when the seat 1 is not wet, the admittance, i.e., conductance G and susceptance B, is approximately the same among AF05, AF05C and NSS. In contrast, when the normal saline solution NSS is sprinkled, the susceptance B of NSS is significantly increased. The susceptance B of NSS is much larger than those of AF05, AF05C. Accordingly, the occupant can be detected by providing a proximity threshold shown by a two-dot chain line in FIG. 10. Erroneous detections due to the conductive liquid can be reduced, when the remote detection and the proximity detection are combined, while the susceptance B of the remote detection is approximately the same among AF05, AF05C and NSS as shown in FIG. 9.

That is, the occupant detection system in the second embodiment detects the occupant based on the admittance, i.e., conductance G and susceptance B. Therefore, even if the seat 1 is wet with a large amount of water, the occupant can be detected.

Figure 11:
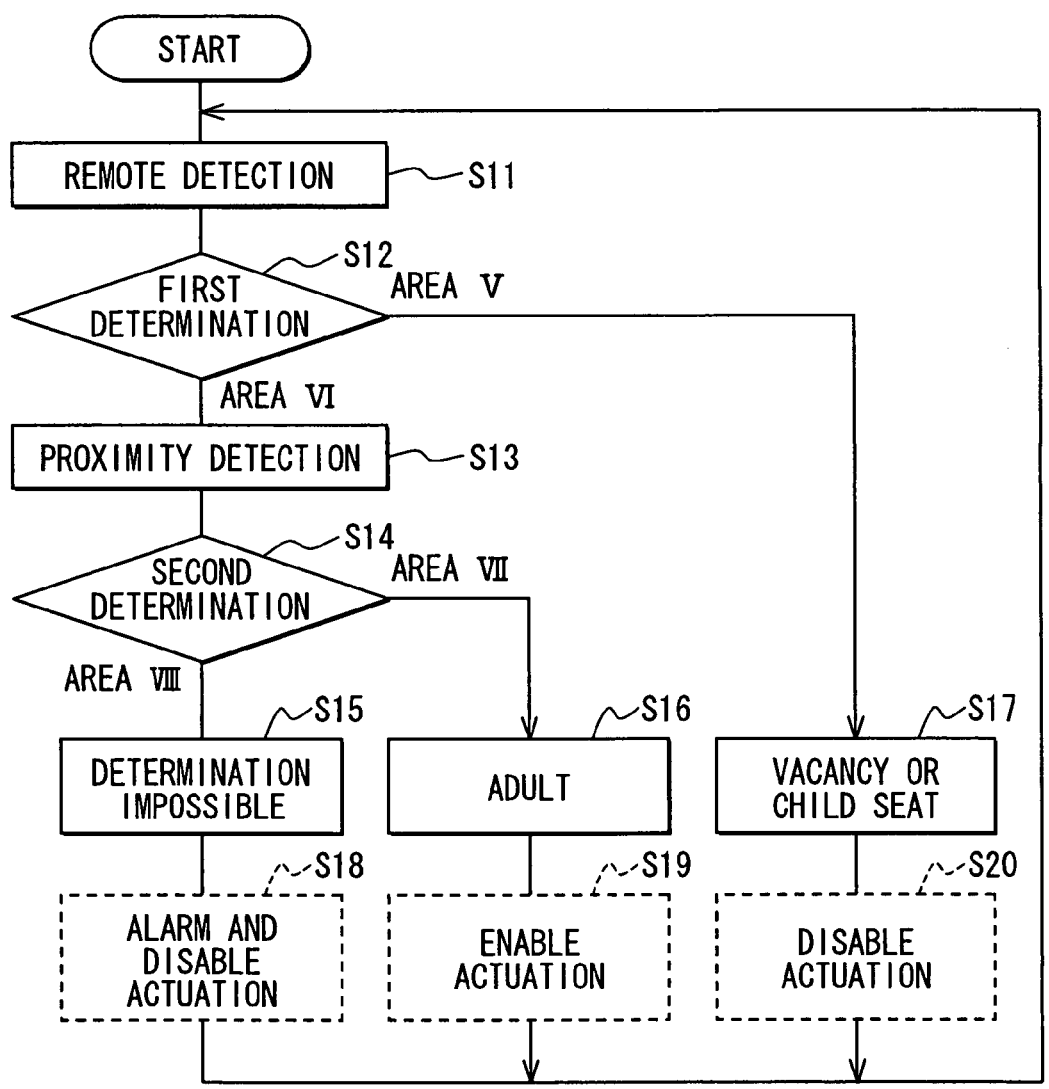
FIG. 11 is a flow chart of occupant detection in the second embodiment.

When the occupant detection system has the remote and proximity thresholds shown in FIGS. 9 and 10, determination of the occupant can be performed as shown in FIG. 11. First, the remote detection (S11) is performed as described above so as to provide the conductance G and the susceptance B between the seat bottom 10 and the vehicle chassis 30. Then, a remote threshold corresponding to the susceptance B is determined based on the conductance G, and a first determination (S12) is performed. The susceptance B is compared with the remote threshold. When the susceptance B is larger than the remote threshold, that is, when the susceptance B is in an area V shown in FIG. 9, the seat 1 is determined to be vacant or the child seat is determined to be on the seat 1 (S17).

In contrast, when the susceptance B is equal to or smaller than the remote threshold, that is, when the susceptance B is in an area VI shown in FIG. 9, the proximity detection (S13) is performed thereafter. A proximity threshold corresponding to the susceptance B of the proximity detection is determined based on a conductance G of the proximity detection, and a second determination (S14) is performed. The susceptance B of the proximity detection is compared with the proximity threshold. When the susceptance B of the proximity detection is larger than the proximity threshold, that is, when the susceptance B is in an area VII shown in FIG. 10, the occupant on the seat 1 is determined to be the adult (S16). When the susceptance B of the proximity detection is equal to or smaller than the proximity threshold, that is, when the susceptance B is in an area VIII shown in FIG. 10, the determination of the occupant is determined to be impossible (S15).

Similarly to the first embodiment, the occupant detection system is capable of sending the detection result to an occupant-restraining device, e.g., air-bag device. Therefore, the occupant-restraining device can be accurately actuated in accordance with the occupant. Specifically, when the seat 1 is determined to be vacant or when the child seat is determined on the seat 1 (S17), the occupant-restraining device is disabled to be actuated even when the vehicle collides with an object (S20).

When the determination of the occupant is determined to be impossible (S15), an alarm is raised and the occupant-restraining device is disabled to be actuated (S18). The occupant-restraining device is enabled to be actuated to protect the occupant (S19), only when the occupant is the adult (S16). In a case in which the child on the child seat is seated on the seat 1 (S17), the occupant-restraining device is disabled to be actuated (S20), because the child may be damaged by the actuation of the occupant-restraining device.

Further, the first embodiment and the second embodiment may be combined. Such changes and modifications are to be understood as being within the scope of the present invention as defined by the appended claims.

What is claimed is:

1. An occupant detection system for detecting an occupant on a seat of a vehicle, the system comprising:
    an antenna electrode in a seat bottom of the seat, the antenna electrode including a proximity electrode constructed with a first electrode and a second electrode arranged adjacent to each other in the seat bottom; and
    an electronic unit connected to the antenna electrode and the vehicle, wherein
    the electronic unit applies a load current to the antenna electrode so as to generate a weak electric field, and detects a potential current passing through the antenna electrode,
    the electronic unit detects an occupant based on both of a first impedance and a first phase difference, and detects a conductive liquid included in the seat bottom based on both of a second impedance and a second phase difference,
    the first impedance, the first phase difference, the second impedance and the second phase difference are calculated based on the load current and the potential current,
    the first impedance is calculated to indicate an impedance between the seat bottom and a vehicle chassis of the vehicle connected to a ground, and
    the second impedance is calculated to indicate an impedance between the first electrode and the second electrode.

2. The occupant detection system according to claim 1, wherein:
    the electronic unit detects the occupant by comparing the first impedance and a threshold corresponding to the first phase difference.

3. The occupant detection system according to claim 1, wherein:
    the electronic unit includes a signal source for applying the load current; and
    the potential current is measured in a shunt of the signal source.

4. An occupant detection system for detecting an occupant on a seat of a vehicle, the system comprising:
    an antenna electrode in a seat bottom of the seat, the antenna electrode including a proximity electrode constructed with a first electrode and a second electrode arranged adjacent to each other in the seat bottom; and
    an electronic unit connected to the antenna electrode and the vehicle, wherein
    the electronic unit applies a load current to the antenna electrode so as to generate a weak electric field, and detects a potential current passing through the antenna electrode,
    the electronic unit detects an occupant based on a conductance and a susceptance of a first admittance, and detects a conductive liquid included in the seat bottom based on a conductance and a susceptance of a second admittance,
    the first admittance and the second admittance are calculated based on the load current and the potential current,
    the first admittance is calculated to indicate an admittance between the seat bottom and a vehicle chassis of the vehicle connected to a ground, and
    the second admittance is calculated to indicate an admittance between the first electrode and the second electrode.

5. The occupant detection system according to claim 4, wherein:
    the electronic unit detects the occupant by comparing the susceptance and a threshold corresponding to the conductance.

6. The occupant detection system according to claim 4, wherein:
    the electronic unit includes a signal source for applying the load current; and
    the potential current is measured in a shunt of the electronic unit.

* * * * *